(12) United States Patent
Hansen

(10) Patent No.: US 8,974,053 B2
(45) Date of Patent: Mar. 10, 2015

(54) CONTACT LENS HAVING PERIPHERAL HIGH MODULUS ZONES

(71) Applicant: Johnson & Johnson Vision Care, Inc., Jacksonville, FL (US)

(72) Inventor: Jonathan Hansen, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 43 days.

(21) Appl. No.: 13/755,985

(22) Filed: Jan. 31, 2013

(65) Prior Publication Data

US 2014/0211149 A1    Jul. 31, 2014

(51) Int. Cl.
G02C 7/04      (2006.01)
B29D 11/00     (2006.01)

(52) U.S. Cl.
CPC .......... G02C 7/049 (2013.01); B29D 11/00048 (2013.01)
USPC .................... 351/159.02; 351/159.33

(58) Field of Classification Search
CPC ........... G02C 7/02; G02C 7/022; G02C 7/049
USPC ....................... 351/159.02, 159.33
See application file for complete search history.

(56) References Cited

U.S. PATENT DOCUMENTS

| | | | |
|---|---|---|---|
| 5,100,225 A | 3/1992 | Rothe | |
| 2009/0088839 A1* | 4/2009 | Hu et al. | 623/6.11 |
| 2009/0141235 A1 | 6/2009 | Collins et al. | |
| 2011/0149232 A1 | 6/2011 | Gerligand | |
| 2011/0149233 A1 | 6/2011 | Gerligand | |
| 2011/0249235 A1 | 10/2011 | Duis et al. | |

FOREIGN PATENT DOCUMENTS

DE     2648840 A   *   4/1977

OTHER PUBLICATIONS

Report from the Intellectual Property Office of Singapore dated Nov. 11, 2014 for Application No. 2014005953.

* cited by examiner

*Primary Examiner* — Darryl J Collins
(74) *Attorney, Agent, or Firm* — Carl J. Evens

(57) ABSTRACT

Soft contact lens having regions of a material forming one or more higher modulus of elasticity zones in the peripheral region of the lenses add stiffness to the contact lenses. This increased stiffness in different zones or regions enable the contact lens to be more easily handled and make it less likely to fold in on itself.

4 Claims, 4 Drawing Sheets

CONTACT LENS HAVING PERIPHERAL HIGH MODULUS ZONES

BACKGROUND OF THE INVENTION

1. Field of the Invention

The present invention relates to ophthalmic lenses, and more particularly to soft contact lenses comprising one or more high modulus of elasticity zones in the peripheral region to stiffen the contact lenses for improved handling and a reduction in the tendency of the contact lens to fold.

2. Discussion of the Related Art

Myopia or nearsightedness is an optical or refractive defect of the eye wherein rays of light from an image focus to a point before they reach the retina. Myopia generally occurs because the eyeball or globe is too long or the shape or contour of the cornea is too steep. A minus powered spherical lens may be utilized to correct myopia. Hyperopia or farsightedness is an optical or refractive defect of the eye wherein rays of light from an image focus to a point after they reach or behind the retina. Hyperopia generally occurs because the eyeball or globe is too short or the shape or contour of the cornea is too flat. A plus powered spherical lens may be utilized to correct hyperopia. Astigmatism is an optical or refractive defect in which an individual's vision is blurred due to the inability of the eye to focus a point object into a focused image on the retina. Unlike myopia and/or hyperopia, astigmatism is unrelated to globe size or corneal steepness, but rather it is caused by a non-rotationally symmetric cornea or from the misalignment or positioning of the crystalline lens. The vast majority of astigmatism occurs due to non-rotationally symmetric corneal curvature. A perfect cornea is rotationally symmetric whereas in most individuals with astigmatism, the cornea is not rotationally symmetric. In other words, the cornea is actually more curved or steeper in one direction than another, thereby causing an image to be stretched out rather than focused to a point. A cylindrical lens or toric contact lens, rather than a spherical lens may be utilized to resolve astigmatism.

Typically, for astigmatic vision correction, mechanical features are designed into the periphery of the contact lens to achieve rotational stability on eye for the required vision correction. These mechanical features incorporate varying thicknesses around the lens periphery which may lead to the contact lenses having a propensity to fold in the package or during lens handling. In addition to folding, the contact lenses may not handle as well as contact lenses with uniform thickness.

Soft contact lenses are typically more comfortable to wear than rigid gas permeable hard contact lenses and this is due to the materials from which the contact lenses are fabricated; namely, silicone hydrogels. These materials have a low modulus of elasticity which makes them less stiff or rigid, thereby making the contact lenses more difficult to handle and prone to folding as is the case for contact lenses for astigmatic correction as explained above.

Accordingly, it would be advantageous to design contact lenses, that are made from silicone hydrogels, which may or may not comprise astigmatic correction, that have increased stiffness in the peripheral zones for improved handling and a reduction in the propensity of the lens to fold without sacrificing comfort.

SUMMARY OF THE INVENTION

The contact lens comprising peripheral high modulus of elasticity zones of the present invention overcomes a number of disadvantages associated with soft contact lenses and in particular soft contact lenses designed for astigmatic correction as briefly described above.

In accordance with one aspect, the present invention is directed to an ophthalmic lens. The ophthalmic lens comprises an optic zone configured for vision correction, the optic zone being formed from a first material having a first modulus of elasticity, a peripheral zone surrounding the optic zone, the peripheral zone being formed from the first material, and one or more high modulus of elasticity zones incorporated into the peripheral zone, the one or more high modulus of elasticity zones being formed from a second material having a second modulus of elasticity, the second modulus of elasticity being greater than the first modulus of elasticity.

In accordance with another aspect, the present invention is directed to a method for fabricating an ophthalmic lens. The method comprises dosing the front curve of a lens mold with a first material to create a region with a first modulus of elasticity in a predetermined pattern, adding a second material with a second modulus of elasticity to the front curve of the lens mold and over the first material, the second modulus of elasticity being lower than the first modulus of elasticity, and mating a back curve of the lens mold to the front curve of the lens mold to form the ophthalmic lens.

The present invention is directed to a contact lens which incorporates one or more high modulus of elasticity zones in the peripheral region or zone of the contact lens to selectively stiffen the contact lens in these zones. By stiffening the contact lens in certain areas, the contact lenses have improved handling characteristics and a reduction in the propensity of the lens to fold without sacrificing the comfort afforded by the low modulus of elasticity silicone hydrogel forming the lens. The one or more high modulus of elasticity zones may be incorporated into any type of soft contact lens for spherical, astigmatic, and/or both spherical and astigmatic correction as well as translating and/or multifocal lenses for treating presbyopia. The one or more high modulus of elasticity zones may be formed in any suitable shape, with any suitable dimensions and be formed from any suitable material. The one or more high modulus of elasticity zones may be formed from a monomer having a higher modulus of elasticity than the bulk monomer forming the contact lens or just simply through the addition of an additive to the lens monomer in a particular region.

The contact lens of the present invention may be manufactured utilizing any suitable process without a significant increase in expense or complexity. This design may be implemented in any number or type of soft contact lenses. In one exemplary embodiment, the manufacturing process simply involves adding a material to the mold in the desired regions which has an elastic modulus higher than that of the remaining material forming the contact lens and which is immiscible or poorly miscible with the remaining material forming the contact lens such that it remains fixed in the region. In other exemplary embodiments, the increased stiffness zones may be manufactured by varying the cure light intensity across the contact lens and pretensioning the contact lens to create resistance to deformation.

Throughout the specification, the term stiffness should be understood to be a function of the elastic modulus of the material, the thickness of the material, the shape of the material, and any tension or stress built into the material. Accordingly, for a given shape and a given thickness, a material with a higher modulus of elasticity will be stiffer than one with a lower modulus of elasticity.

BRIEF DESCRIPTION OF THE DRAWINGS

The foregoing and other features and advantages of the invention will be apparent from the following, more particu

DETAILED DESCRIPTION OF THE PREFERRED EMBODIMENTS

Figure 1:
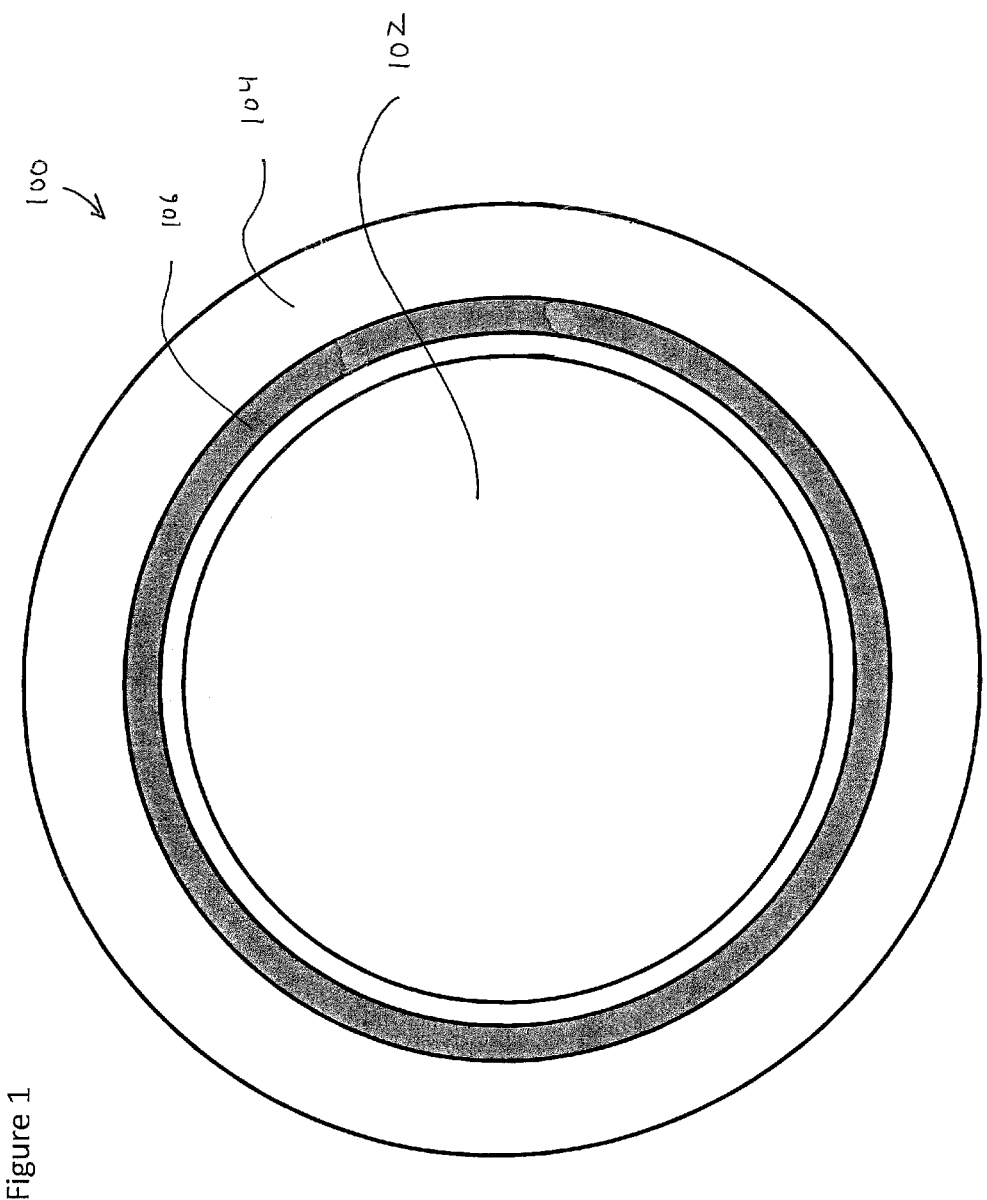
- FIG. 1 is a diagrammatic representation of a first exemplary contact lens comprising a high modulus of elasticity zone incorporated into the peripheral zone of the lens in accordance with the present invention.

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials. However, these new contact lenses are not totally without limitations.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer-plastic materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a translucent tint that is meant to enhance one's natural eye color, the color tint contact lens comprises a darker, opaque tint meant to change one's eye color, and the light filtering tint contact lens functions to enhance certain colors while muting others. Rigid gas permeable hard contact lenses are made from silicone polymers but are more rigid than soft contact lenses, do not contain water, and thus hold their shape and are more durable, but generally less comfortable. Bifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

Soft contact lenses are typically more comfortable to wear than rigid gas permeable hard contact lenses. Currently available contact lenses are made from silicone hydrogels, including etafilcon, galyfilcon, senofilcon and narafilcon. Other silicone hydrogels include lotrafilcon, balafilcon, vifilcon and omafilcon. These materials typically have a low modulus of elasticity, for example, etafilcon A has a Young's modulus of about $0.3 \times 10^6$ Pa, galyfilcon A has a Young's modulus of about $0.43 \times 10^6$ PA, senofilcon A has a Young's modulus of about $0.72 \times 10^6$ Pa, balafilcon A has a Young's modulus of about $1.1 \times 10^6$ Pa, and lotrafilcon A has a Young's modulus of about $1.4 \times 10^6$ Pa. Because the modulus of elasticity is so low for these materials, handing of the contact lenses becomes more difficult. For example, in astigmatic vision correction, mechanical features are designed into the periphery of the contact lens to achieve rotational stability on eye for the required vision correction. These mechanical features typically incorporate varying thickness around the lens periphery, which may lead to the lens having a propensity to fold in the package or during lens handing. In particular, when attempting to remove the lens from the package and/or attempting to place the lens on one's eye the presence of a folded lens may make these tasks more difficult to accomplish. In addition to folding, the contact lenses may not handle as well as uniform thickness contact lenses.

The present invention incorporates one or more high modulus of elasticity zones in the peripheral region of a contact lens which stiffens the contact lens in these zones for improved handling and reduction in the propensity of the lens to fold without sacrificing comfort. The one or more high modulus of elasticity zones may be incorporated into any type of soft contact lens for spherical, astigmatic, and/or both spherical and astigmatic correction as well as translating and/or multifocal lenses for treating presbyopia. The one or more high modulus of elasticity zones may comprise any suitable configuration and dimensions. For example, in one exemplary embodiment, the one or more high modulus of elasticity zones may comprise a single continuous ring around the periphery of the lens. The orientation and directionality may also be tailored to the desired stiffness response (i.e.: a circumferential region of high modulus would result in a different response as compared to an axial spar of similar dimensions and modulus). The dimensions of the ring may be varied to meet a particular design constraint or requirement. In another exemplary embodiment, the one or more high modulus of elasticity zones may comprise one or more discrete regions positioned on the contact lens to reinforce these areas. The one or more high modulus of elasticity zones may be formed in any number of ways utilizing any number of materials. In one exemplary embodiment, the one or more high modulus of elasticity zones may be formed from a distinct material having a higher modulus of elasticity than the material forming the bulk of the contact lens. In an alternate exemplary embodiment, the one or more high modulus of elasticity zones may be formed by adding a material that changes the modulus of elasticity of the bulk material in desired regions.

While the present invention may be particularly advantageous with soft contact lenses for astigmatism correction, it is important to note that the high modulus of elasticity zones may be utilized to enhance the performance of any soft contact lens.

Referring now to FIG. 1, there is illustrated a first exemplary embodiment of a contact lens 100 comprising an optic zone 102, a peripheral zone 104 and a high modulus of elasticity zone 106. The optic zone 102 is the portion of the contact lens 100 through which vision correction is obtained. In other words, the optic zone 102 provides vision correction and is designed for a specific need such as single vision myopia or hyperopia correction, astigmatism vision correction, bi-focal vision correction, multi-focal vision correction, custom correction or any other design that may provide vision correction. The peripheral zone 104 surrounds the optic zone 102 and provides mechanical stability for the contact lens 100 on the eye. In other words, the peripheral zone 104 provides mechanical features which influence positioning and stabilization of the contact lens 100 on the eye, including centration and orientation. Orientation stabilization is fundamental when the optic zone 102 includes non-rotationally symmetric features, such as astigmatic correction and/or high order aberration correction. In some contact lens designs, an optional intermediate zone between the optic zone 102 and the peripheral zone 104 may be utilized. The optional intermediate zone ensures that the optic zone 102 and the peripheral zone 104 are smoothly blended. It is important to note that both the optic zone 102 and the peripheral zone 104 may be designed independently, though sometimes their designs are strongly related when particular requirements are necessary. For example, the design of a toric contact lens with an astigmatic optic zone might require a particular peripheral zone for maintaining the contact lens at a predetermined orientation on the eye. Toric contact lenses have different designs than spherical contact lenses. The optic zone portion of toric contact lenses has two powers, spherical and cylindrical, created with curvatures generally at right angles to each other. The powers are required to maintain position at the specific angle, cylinder axis, on the eye to provide the required astigmatic vision correction. The mechanical or outer peripheral zone of toric contact lenses typically comprises a stabilization means to properly rotate and orient the cylindrical or astigmatic axis into position while being worn on the eye. Rotating the contact lens to its proper position when the contact lens moves, or when the contact lens is inserted is important in producing a toric contact lens. It is also important to note that while in this exemplary embodiment, the elements or zones are circular or annular, non-circular zones and/or non-annular configurations are possible.

In this exemplary embodiment, the single high modulus of elasticity zone 106 comprises an annular ring positioned in the peripheral zone 104 proximate to outer circumference of the optic zone 102. As set forth above, the high modulus of elasticity zone 106 may be formed from any number of materials, utilizing any number of processes and in any number of configurations depending on the desired performance parameters of the contact lens 100. A material with a higher elastic modulus is stiffer than a material with a lower elastic modulus. The stiffness of a component, element and/or part determines how much it will deflect or deform under a given load. From a materials perspective, the more stiff a material is, the higher the load required to elastically deform it; however, it is important to note that in general stiffness is not the same as elastic modulus, the elastic modulus is an inherent material property, whereas stiffness is a function of the elastic modulus as well as the thickness, cross-sectional area and/or shape of the element. Accordingly, for a given cross-sectional shape and thickness, the higher the modulus of elasticity of the material, the greater the stiffness of the material in that region, alternately. materials with identical elastic moduli may be fabricated to have different stiffness depending on the geometric properties (e.g.: a item with a rectangular cross-section has a greater resistance to bending when the bending moment is aligned to the longer side of the rectangle as compared to the short side). The increased stiffness in the single high modulus of elasticity zone 106 will make the contact lens 100 less likely to fold and easier to handle.

In an alternate exemplary embodiment, the high modulus of elasticity zones may be positioned at discrete locations within the peripheral zone of the contact lens. The Acuvue® Oasys® for Astigmatism and the Acuvue® Advance® For Astigmatism each feature an accelerated stabilization design. In this design, the contact lens comprises four active zones of added thickness positioned in the midperiphery of the contact lens and a dual thin zone in the superior and inferior portions of the periphery. Accordingly, with this type of design, high modulus of elasticity zones would preferably be positioned at the thin zones symmetric about the vertical meridian of the contact lens.

Figure 2:
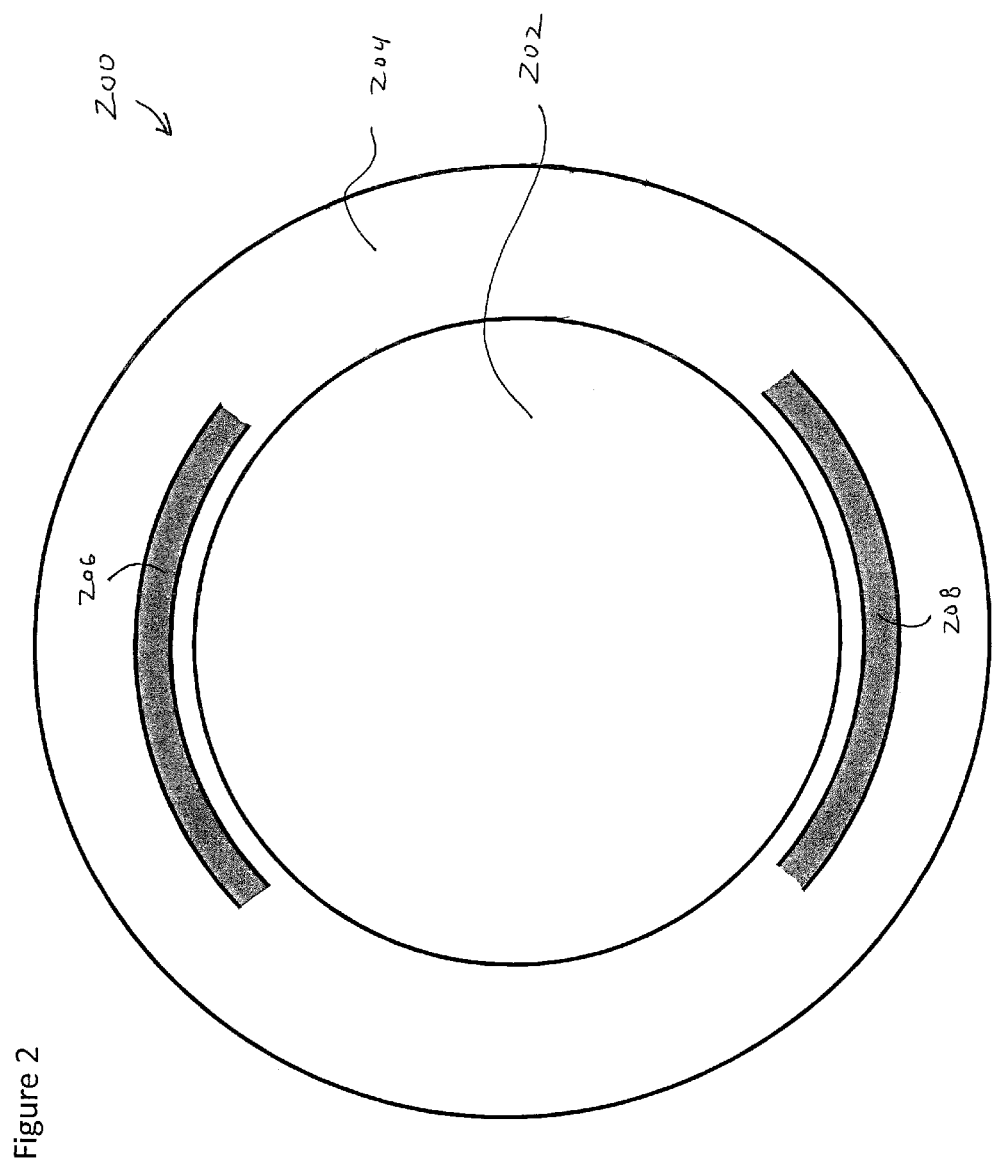
FIG. 2 is a diagrammatic representation of a second exemplary contact lens comprising two high modulus of elasticity zones incorporated into the peripheral zone of the lens in accordance with the present invention.
Figure 3:
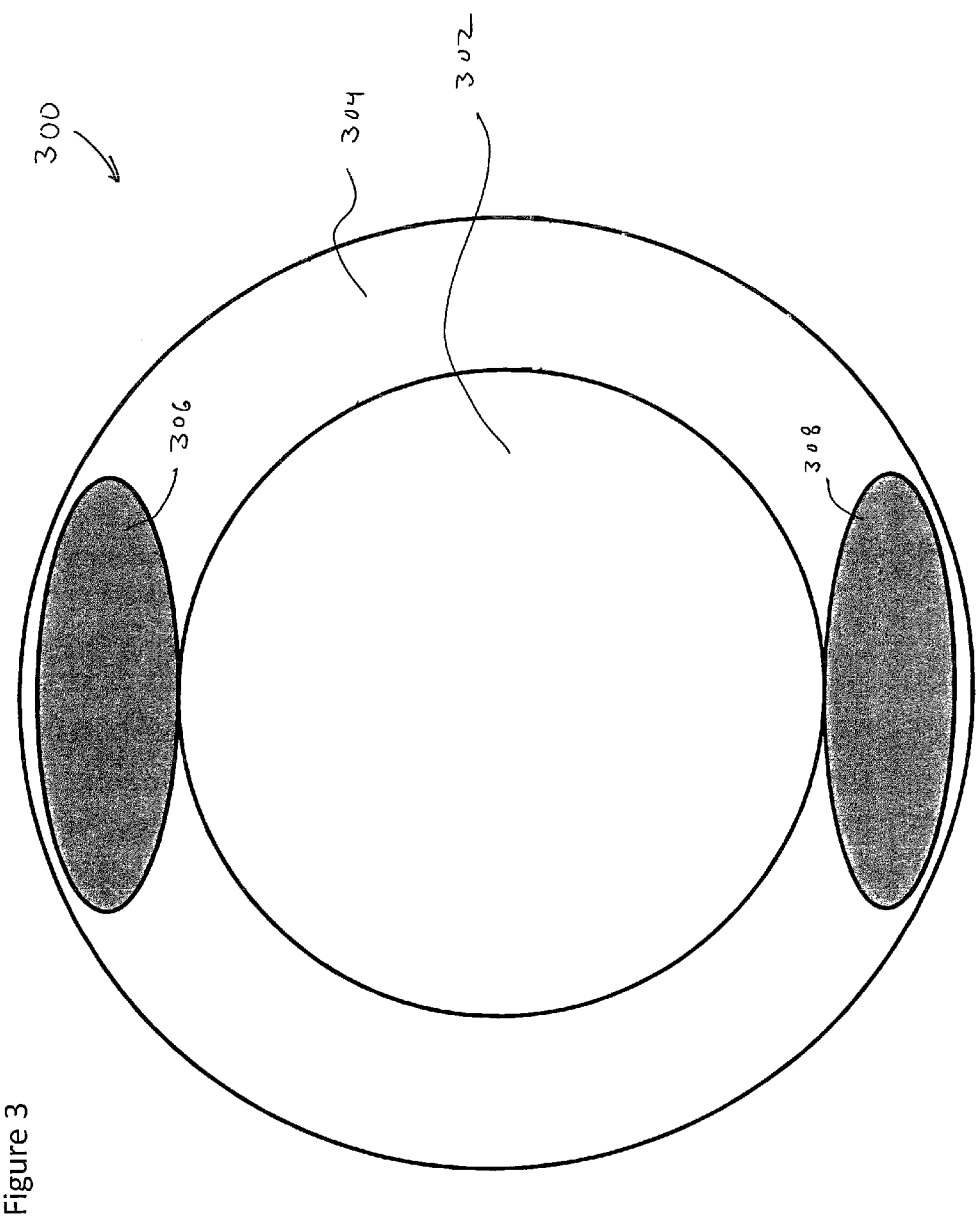
FIG. 3 is a diagrammatic representation of a third exemplary contact lens comprising two high modulus of elasticity zones incorporated into the peripheral zone of the lens in accordance with the present invention.

FIG. 2 illustrates an exemplary embodiment of a contact lens 200 comprising an optic zone 202, a peripheral zone 204 and two discrete high modulus of elasticity zones 206 and 208. For purposes of this description, the contact lens 200 is assumed to be designed in accordance with the accelerated stabilization design described above. In this exemplary embodiment, the high modulus of elasticity zones 206 and 208 are annular structures positioned in regions of thinner contact lens material as described above. As in the previously described exemplary embodiment, the high modulus of elasticity zones 206 and 208 may be varied in thickness, width, shape, orientation and may comprise any suitable material having a modulus of elasticity greater than that of the bulk contact lens material. FIG. 3 illustrates an exemplary embodiment of a contact lens 300 with the same type of thin zones as in FIG. 2 (accelerated stabilization design), but wherein the shape of the high modulus of elasticity zones 306 and 308 are substantially oval and contact the optic zone 302 and occupy a significant portion of the peripheral zone 304.

It is important to note that any suitable biocompatible materials may be utilized to create the high modulus of elasticity zones in the contact lens. The materials are preferably clear, are compatible with the monomer comprising the bulk of the contact lens and have the same index of refraction. Existing processes for forming contact lenses may be easily modified to manufacture contact lenses in accordance with the present invention. Viscosity differences in monomers may be used to maintain separation during the lens manufacturing process. Consideration must be made to the shrinkage and expansion rates of both materials in order to form an acceptable lens.

Figure 4:
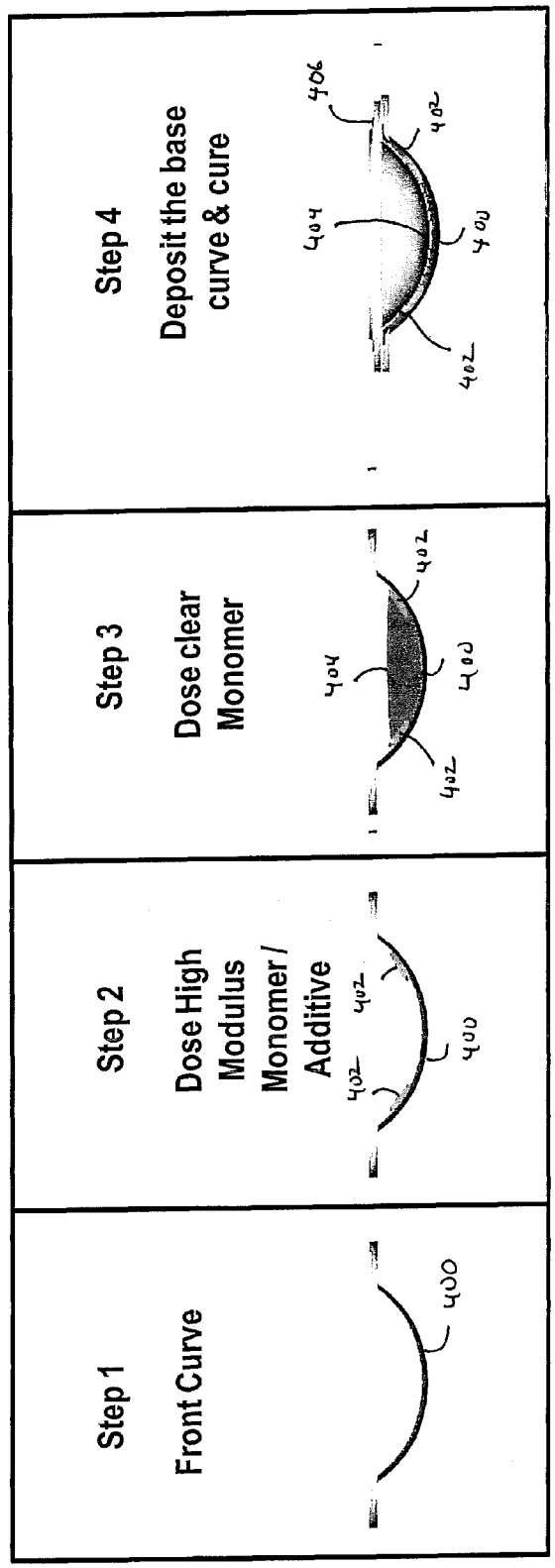
FIG. 4 diagrammatic representation of an exemplary process for manufacturing contact lenses comprising one or more high modulus of elasticity zones in accordance with the present invention.

Referring now to FIG. 4, there is illustrated a simple, exemplary process for creating high modulus of elasticity zones in a contact lens. In a first step, the front curve 400 of the mold for the contact lens is positioned for further processing. In a second step, a higher modulus of elasticity monomer 402 is dosed in the desired pattern on the front curve plastic 400 of the mold. As described above, any number of suitable materials may be utilized in this step. In a third step, the bulk lens monomer 404 is dosed over the higher modulus of elasticity monomer 402 and the front curve 400 of the mold. In a fourth step, the back curve 406 of the mold is positioned or mated to the front curve 402 of the mold to create the shape of the lens and thereafter cured by known means to create a contact lens with one or more high modulus of elasticity zones.

In accordance with another exemplary embodiment, stiffer zones may be achieved through a controlled, but varied curing process. For example, by varying the cure light intensity across the contact lens, varying resultant stiffness's may be realized in different regions.

In a preferred exemplary embodiment, the bulk material for forming the contact lens comprises narafilcon A and the higher modulus of elasticity zones comprises a modified version of narafilcon A with a higher modulus of elasticity. The modified version of narafilcon A is created by an increase in the cross-linking agent.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An ophthalmic lens comprising:
    an optic zone configured for vision correction, the optic zone being formed from a first material having a first modulus of elasticity;
    a peripheral zone surrounding the optic zone, the peripheral zone being formed from the first material and defining a superior region, amid periphery region and an inferior region; and
    multiple active zones of added thickness positioned in the midperiphery region;
    thin zones positioned in the superior and inferior regions;
    one or more high modulus of elasticity zones incorporated into at least a portion of the thin zones in the peripheral zone, the one or more high modulus of elasticity zones being formed from a second material having a second modulus of elasticity.

2. The ophthalmic lens according to claim 1, wherein the ophthalmic lens comprises a contact lens.

3. The ophthalmic lens according to claim 2, wherein the contact lens comprises a soft contact lens.

4. The ophthalmic lens according to claim 3, wherein the soft contact lens comprises a silicone hydrogel.

* * * * *